(12) United States Patent
Duquesne et al.

(10) Patent No.: US 9,125,343 B2
(45) Date of Patent: Sep. 8, 2015

(54) AUXILIARY AXLE FOR AN AGRICULTURAL HARVESTER DURING ROAD TRANSPORT

(71) Applicant: CNH Industrial America LLC, New Holland, PA (US)

(72) Inventors: Frank Duquesne, Zwevegem (BE); Tom Somers, Aalter (BE); Gudrun Baeckelandt, Bruges (BE); Michael Carpentier, Varsenare (BE); Jeff Trowbridge, Stevens, PA (US)

(73) Assignee: CNH Industrial America LLC, New Holland, PA (US)

( * ) Notice: Subject to any disclaimer, the term of this patent is extended or adjusted under 35 U.S.C. 154(b) by 12 days.

(21) Appl. No.: 14/070,158

(22) Filed: Nov. 1, 2013

(65) Prior Publication Data

US 2015/0121829 A1    May 7, 2015

(51) Int. Cl.
*A01B 73/00* (2006.01)
*A01D 75/00* (2006.01)
*A01D 41/12* (2006.01)

(52) U.S. Cl.
CPC ..................................... *A01D 41/12* (2013.01)

(58) Field of Classification Search
CPC ...... A01B 73/00; A01B 73/005; A01D 75/00; A01D 75/02; A01D 41/06; A01D 41/127; A01D 41/141; A01D 41/12; A01D 41/14; A01D 43/081
USPC ........... 56/15.1, 11.9, 364, 366, 1, 14.7, 15.8, 56/208, 228, 14.5, 10.2 E, 297, 3, 14; 172/311, 388, 452, 669, 275; 37/231–236; 280/481, 495; 180/89.13
See application file for complete search history.

(56) References Cited

U.S. PATENT DOCUMENTS

| | | | |
|---|---|---|---|
| 6,282,875 B1 | 9/2001 | Holtkotte et al. | |
| 6,789,379 B2 | 9/2004 | Heidjann et al. | |
| 6,843,046 B2 * | 1/2005 | Heidjann et al. | 56/208 |
| 7,908,838 B2 * | 3/2011 | Hohlfeld et al. | 56/228 |
| 8,122,694 B2 * | 2/2012 | Bich et al. | 56/15.8 |
| 2006/0150605 A1 | 7/2006 | Wubbels et al. | |

FOREIGN PATENT DOCUMENTS

| | | |
|---|---|---|
| DE | 102008044486 A1 | 4/2009 |
| EP | 1046329 | 10/2000 |
| EP | 1269825 | 1/2003 |
| EP | 1277392 | 1/2003 |
| EP | 1394021 | 3/2004 |

* cited by examiner

*Primary Examiner* — Robert Pezzuto
(74) *Attorney, Agent, or Firm* — Patrick M. Sheldrake; Seyed V. Sharifi T.

(57) ABSTRACT

An agricultural harvester includes a chassis and a feeder housing pivotally mounted to the chassis. The agricultural harvester is characterized in that an axle assembly is pivotally mounted to the feeder housing. A hydraulic actuator is coupled with the axle assembly for pivotally moving the axle assembly in upward and downward directions from the feeder housing. A road mode switch provides a first output signal indicative of a field mode and a second output signal indicative of a road mode. A controller is coupled with the road mode switch and the hydraulic actuator. The controller receives the second output signal from the road mode switch and controls the hydraulic actuator, whereby the hydraulic actuator provides a substantially constant down force between the axle assembly and a ground surface.

21 Claims, 11 Drawing Sheets

AUXILIARY AXLE FOR AN AGRICULTURAL HARVESTER DURING ROAD TRANSPORT

BACKGROUND OF THE INVENTION

1. Field of the Invention

The present invention relates to agricultural harvesters such as combines, and, more particularly, to heavy harvesters which utilize a deployable axle during road transport.

2. Description of the Related Art

An agricultural vehicle known as a harvester "combine" is historically termed such because it combines multiple harvesting functions with a single harvesting unit, such as picking, threshing, separating and cleaning. A combine includes a header which removes the crop from a field, and a feeder housing which transports the crop matter into a threshing rotor. The threshing rotor rotates within a perforated housing, which may be in the form of adjustable concaves, and performs a threshing operation on the crop to remove the grain. Once the grain is threshed it falls through perforations in the concaves onto a grain pan. From the grain pan the grain is cleaned using a cleaning system, and is then transported to a grain tank onboard the combine. The cleaning system includes a cleaning fan which blows air through oscillating sieves to discharge chaff and other debris toward the rear of the combine. Non-grain crop material such as straw from the threshing section proceeds through a straw chopper and out the rear of the combine. When the grain tank becomes full, the combine is positioned adjacent a vehicle into which the grain is to be unloaded, such as a semi-trailer, gravity box, straight truck, or the like; and an unloading system on the combine is actuated to transfer the grain into the vehicle.

More particularly, a rotary threshing or separating system includes one or more rotors which can extend axially (front to rear) or transversely within the body of the combine, and which are partially or fully surrounded by a perforated concave. The crop material is threshed and separated by the rotation of the rotor within the concave. Coarser non-grain crop material such as stalks and leaves are transported to the rear of the combine and discharged back to the field. The separated grain, together with some finer non-grain crop material such as chaff, dust, straw, and other crop residue are discharged through the concaves and fall onto the grain pan where they are transported to the cleaning system. Alternatively, the grain and finer non-grain crop material may also fall directly onto the cleaning system itself.

The cleaning system further separates the grain from non-grain crop material, and typically includes a fan directing an air flow stream upwardly and rearwardly through vertically arranged sieves which oscillate in a fore and aft manner. The air flow stream lifts and carries the lighter non-grain crop material towards the rear end of the combine for discharge to the field. Clean grain, being heavier, and larger pieces of non-grain crop material, which are not carried away by the air flow stream, fall onto a surface of an upper sieve (also known as a chaffer sieve) where some or all of the clean grain passes through to a lower sieve (also known as a cleaning sieve). Grain and non-grain crop material remaining on the upper and lower sieves are physically separated by the reciprocating action of the sieves as the material moves rearwardly. Any grain and/or non-grain crop material remaining on the top surface of the upper sieve are discharged at the rear of the combine. Grain falling through the lower sieve lands on a bottom pan of the cleaning system, where it is conveyed forwardly toward a clean grain auger.

The clean grain auger is positioned below the lower sieve, and receives clean grain from each sieve and from the bottom pan of the cleaning system. The clean grain auger then augers the clean grain laterally sideways to a clean grain elevator, which in turn conveys the clean grain to a grain tank onboard the combine.

For total allowed axle weight requirements, a possible solution to meet European legislation is to use a third axle mounted under the feeder housing of larger harvesters. In road mode, this axle must be deployed in such a way as to provide a specified force onto the driving surface with the feeder housing at a specific height. The force is maintained by a hydraulic cylinder which is connected to the third axle.

What is needed in the art is a large/heavy harvester which more consistently and reliably utilizes a deployable third axle for maximum allowable axle weight requirements during road transport.

SUMMARY OF THE INVENTION

The present invention relates to a pivotally coupled and deployable axle, and the deployment sequence in which the combine goes into road transport mode. In one embodiment, the header is raised fully so that when the third axle is lowered, the supporting cylinder is allowed to extend completely. At that point, the hydraulic control valve applies a predetermined pressure to the accumulator until a steady pressure is obtained. Then a valve is closed to lock this fluid into the accumulator. The last step is to lower the feeder housing to the specific height which is sensed on the combine chassis. While the feeder is lowering, the pressure in the accumulator will increase because of the oil displacement from the support cylinder. Once the feeder is in its final position, the pressure in the hydraulic cylinder is such that the third axle provides the correct force on the road surface.

The invention in one form is directed to an agricultural harvester, including a chassis, a feeder housing pivotally mounted to the chassis, and an axle assembly pivotally mounted to the feeder housing. A hydraulic actuator is coupled with the axle assembly for pivotally moving the axle assembly in upward and downward directions from the feeder housing. A road mode switch provides a first output signal indicative of a field mode and a second output signal indicative of a road mode. A controller is coupled with the road mode switch and the hydraulic actuator. The controller receives the second output signal from the road mode switch and controls the hydraulic actuator, whereby the hydraulic actuator provides a substantially constant down force between the axle assembly and a ground surface.

The invention in another form is directed to a method of operating an agricultural harvester which includes a chassis, a feeder housing pivotally mounted to the chassis, and an axle assembly mounted to the feeder housing and including a wheel. The method includes the steps of:

selectively actuating a road mode switch corresponding to a field mode or a road mode, the road mode switch providing a first output signal indicative of a field mode and a second output signal indicative of a road mode; and controlling a deployment of the axle assembly by pivoting the axle assembly from a field position to a transport position using a hydraulic actuator, when the road mode switch is actuated for the road mode, whereby the actuator provides a substantially constant down force between the wheel and a ground surface.

An advantage of the present invention is that a constant down force is applied between the axle assembly and ground surface when in a road mode, regardless of surface irregularities of the ground surface.

Another advantage is that the road mode is not allowed unless the axle assembly is properly deployed.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one embodiment of the invention, in one form, and such exemplification is not to be construed as limiting the scope of the invention in any manner.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Figure 1:
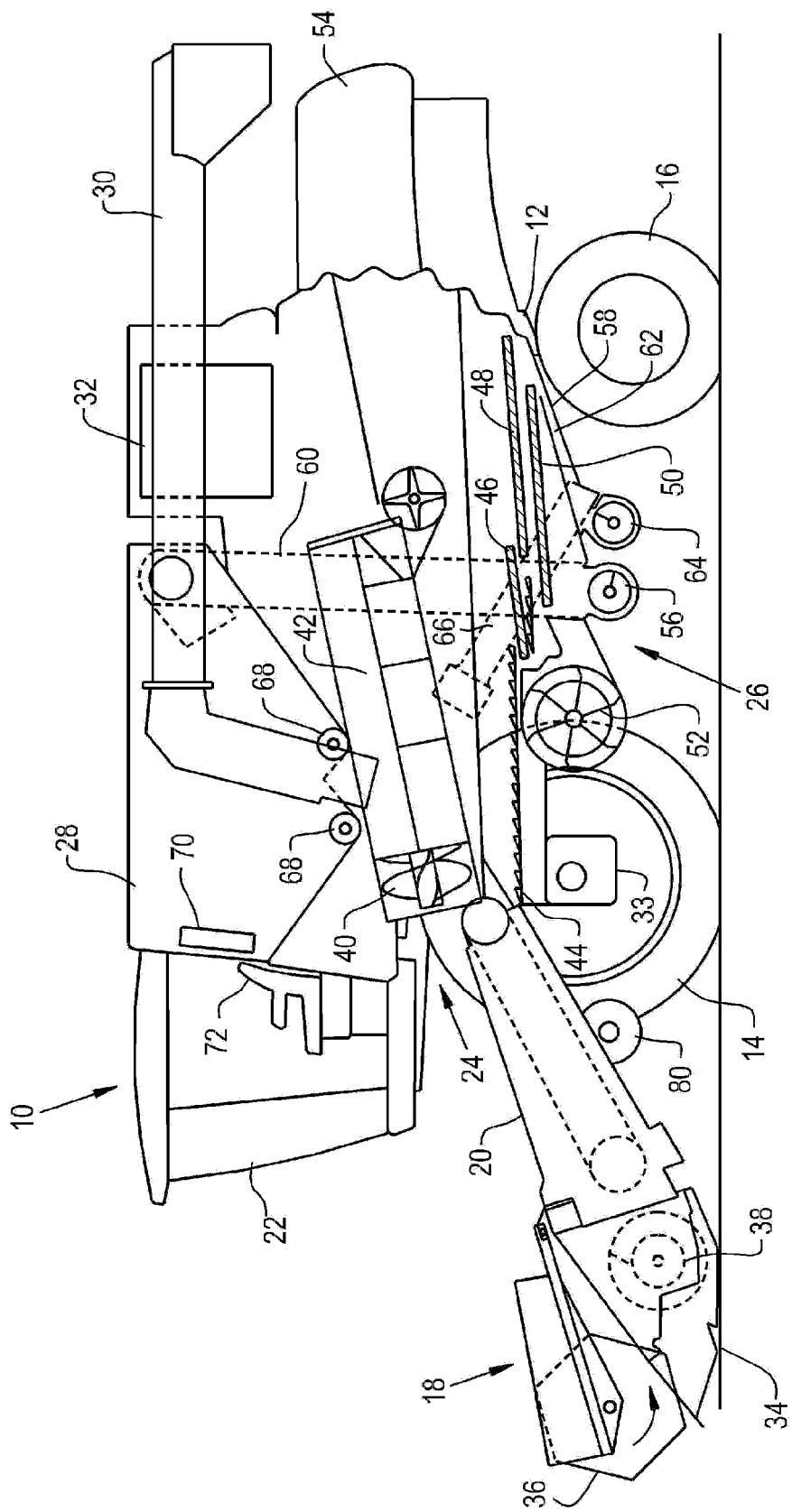
FIG. 1 is a side view of an embodiment of an agricultural harvester in the form of a combine which includes an embodiment of a deployable axle assembly of the present invention.

Referring now to the drawings, and more particularly to FIG. 1, an agricultural harvester is shown in the form of a combine 10, but could be a different type of harvester, depending on the need or application. Combine 10 generally includes a chassis 12, ground engaging wheels 14 and 16, header 18, feeder housing 20, an operator station with a cab 22, threshing and separating system 24, cleaning system 26, grain tank 28, and unloading auger 30.

In the illustrated embodiment, front wheels 14 are larger flotation type wheels, and rear wheels 16 are smaller steerable wheels. Motive force is selectively applied to front wheels 14 through a power plant in the form of a diesel engine 32 and a transmission (not shown) driven by engine 32.

Header 18 is mounted to the front of combine 10 and includes a cutter bar 34 for severing crops from a field during forward motion of combine 10. A rotatable reel 36 feeds the crop into header 18, and a double auger 38 feeds the severed crop laterally inwardly from each side toward feeder housing 20. Feeder housing 20 conveys the cut crop to threshing and separating system 24, and is selectively vertically movable using appropriate actuators, such as hydraulic cylinders (not shown). Header 18 may also be differently configured, such as a multi-row corn header.

Threshing and separating system 24 is of the axial-flow type, and generally includes a rotor 40 at least partially enclosed by and rotatable within a corresponding perforated concave 42. The cut crops are threshed and separated by the rotation of rotor 40 within concave 42, and larger elements, such as stalks, leaves and the like are discharged from the rear of combine 10. Smaller elements of crop material including grain and non-grain crop material, including particles lighter than grain, such as chaff, dust and straw, are discharged through perforations of concave 42. Threshing and separating system 24 can also be a different type of system, such as a system with a transverse rotor rather than an axial rotor, etc.

Grain which has been separated by the threshing and separating assembly 24 falls onto a grain pan 44 and is conveyed toward cleaning system 26. Cleaning system 26 may include an optional pre-cleaning sieve 46, an upper sieve 48 (also known as a chaffer sieve), a lower sieve 50 (also known as a cleaning sieve), and a cleaning fan 52. Grain on sieves 46, 48 and 50 is subjected to a cleaning action by fan 52 which provides an air flow through the sieves to remove chaff and other impurities such as dust from the grain by making this material airborne for discharge from straw hood 54 of combine 10. Grain pan 44 and pre-cleaning sieve 46 oscillate in a fore-to-aft manner to transport the grain and finer non-grain crop material to the upper surface of upper sieve 48. Upper sieve 48 and lower sieve 50 are vertically arranged relative to each other, and likewise oscillate in a fore-to-aft manner to spread the grain across sieves 48, 50, while permitting the passage of cleaned grain by gravity through the openings of sieves 48, 50.

Clean grain falls to a clean grain auger 56 positioned crosswise below and toward the front of lower sieve 50. Clean grain auger 56 receives clean grain from each sieve 48, 50 and from bottom pan 58 of cleaning system 26. Clean grain auger 56 conveys the clean grain laterally to a generally vertically arranged grain elevator 60 for transport to grain tank 28. Tailings from cleaning system 26 fall to a tailings auger trough 62. The tailings are transported via tailings auger 64 and return auger 66 to the upstream end of cleaning system 26 for repeated cleaning action. A pair of grain tank augers 68 at the bottom of grain tank 28 convey the clean grain laterally within grain tank 28 to unloading auger 30 for discharge from combine 10.

Combine 10 also includes one or more onboard electrical controllers 70 which control various functions onboard combine 10. Combine 10 is shown with a single controller 70 positioned at the rear of cab 22; however, the number and placement of the controllers can vary depending on the particularly configured combine. Controller 70 receives input signals corresponding to various operator selected functions, and then controls various mechanical components onboard combine 10 corresponding to the operator selected functions. Controller 70 can also receive input signals from various sensors onboard combine 10, and controls various mechanical components onboard combine 10 based on the sensor output signals.

Figure 2:
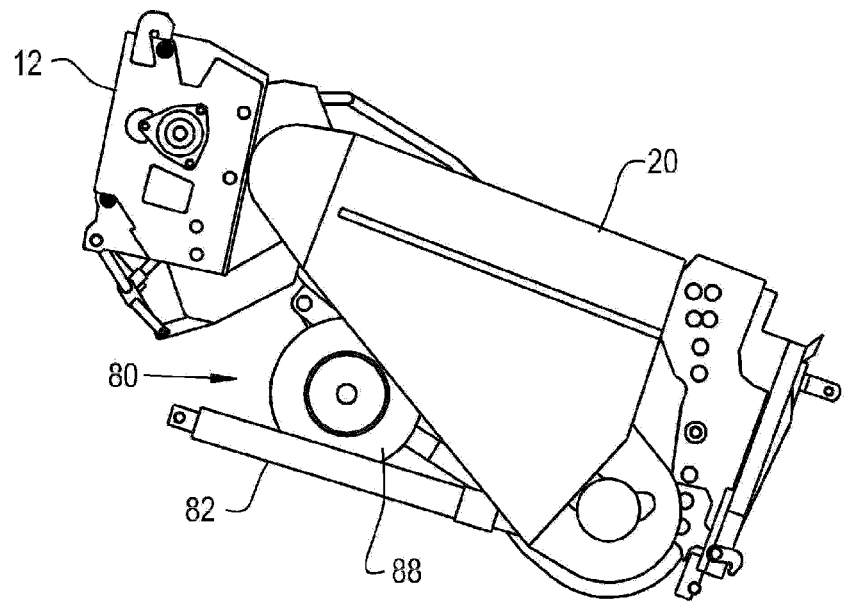
FIG. 2 is a side view of the feeder housing shown in FIG. 1, with the deployable axle assembly in a retracted state for field operation.
Figure 3:
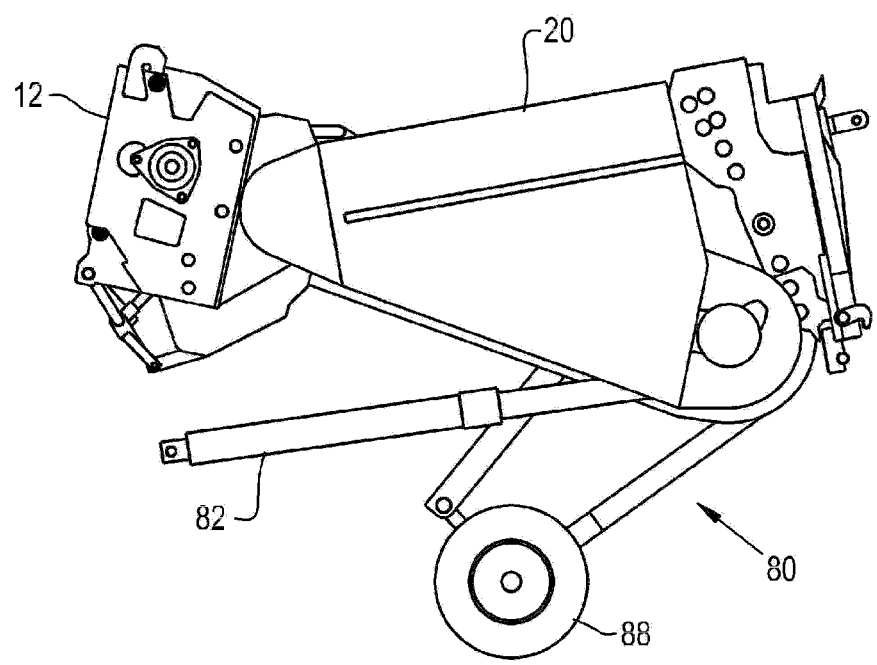
FIG. 3 is a side view of the feeder housing shown in FIGS. 1 and 2, with the deployable axle assembly in an extended state for road transport.
Figure 4:
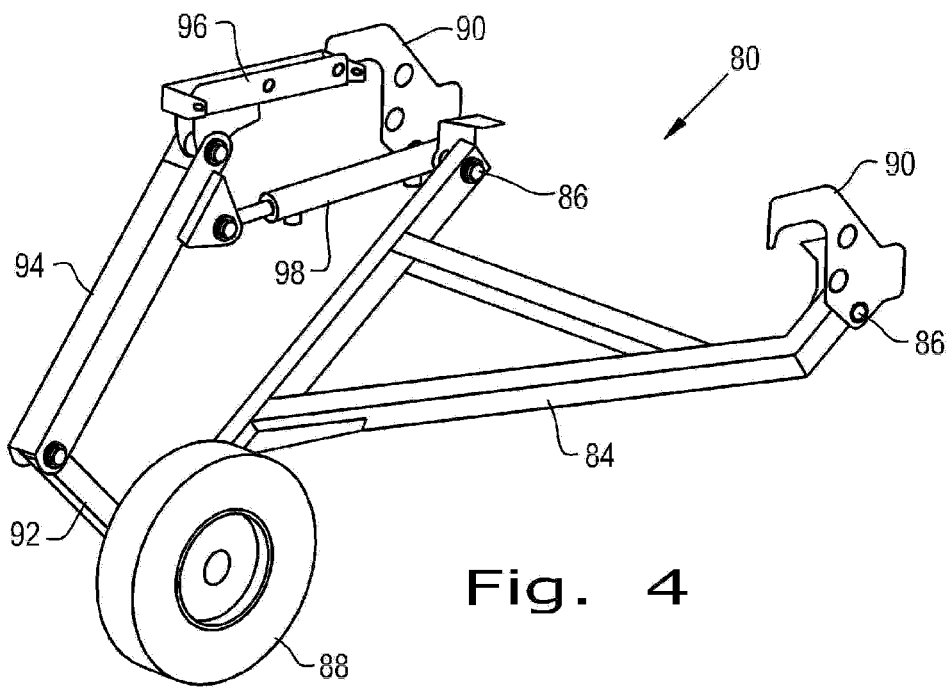
FIGS. 4 and 5 are perspective views of the axle assembly shown in FIGS. 1-3.
Figure 5:
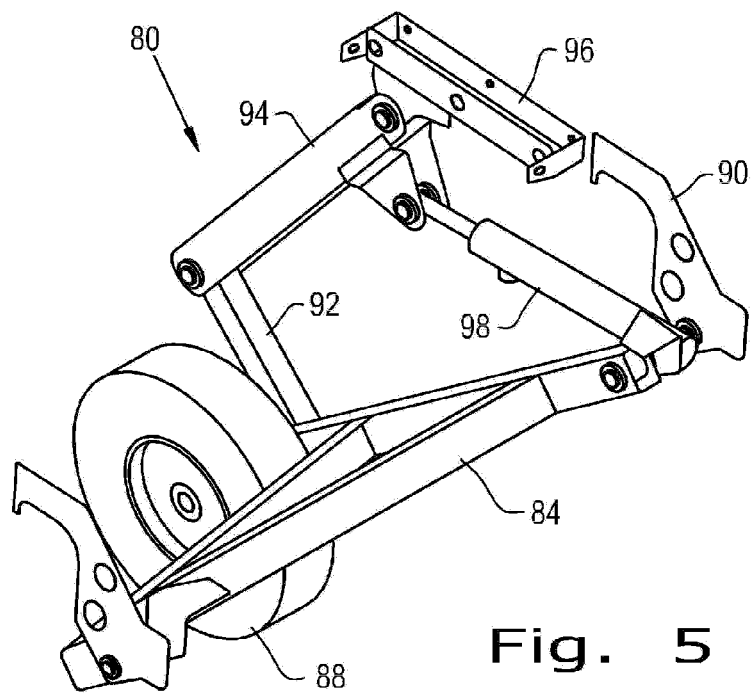
Figure 6:
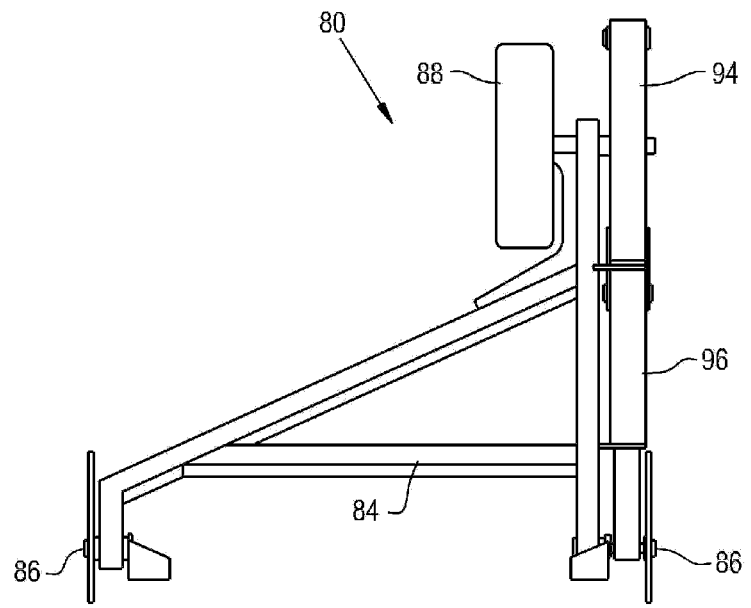
FIG. 6 is a bottom view of the axle assembly shown in FIGS. 1-5.
Figure 7:
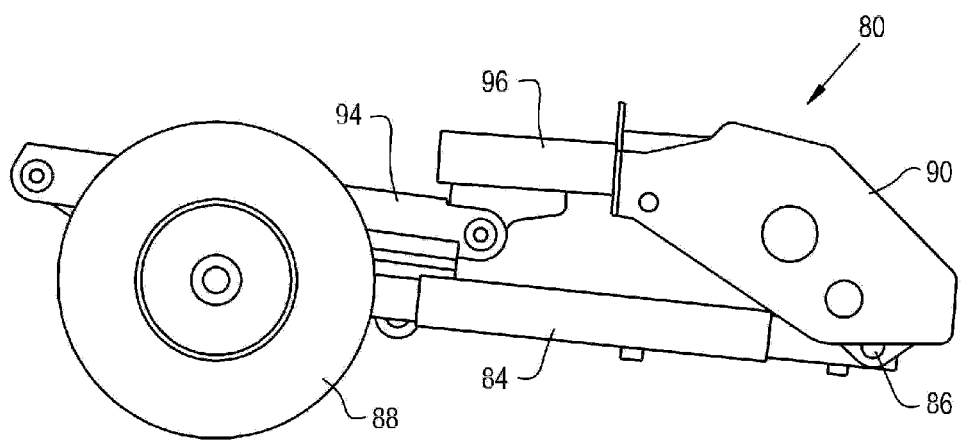
FIG. 7 is a side view of the axle assembly shown in a retracted position.
Figure 8:
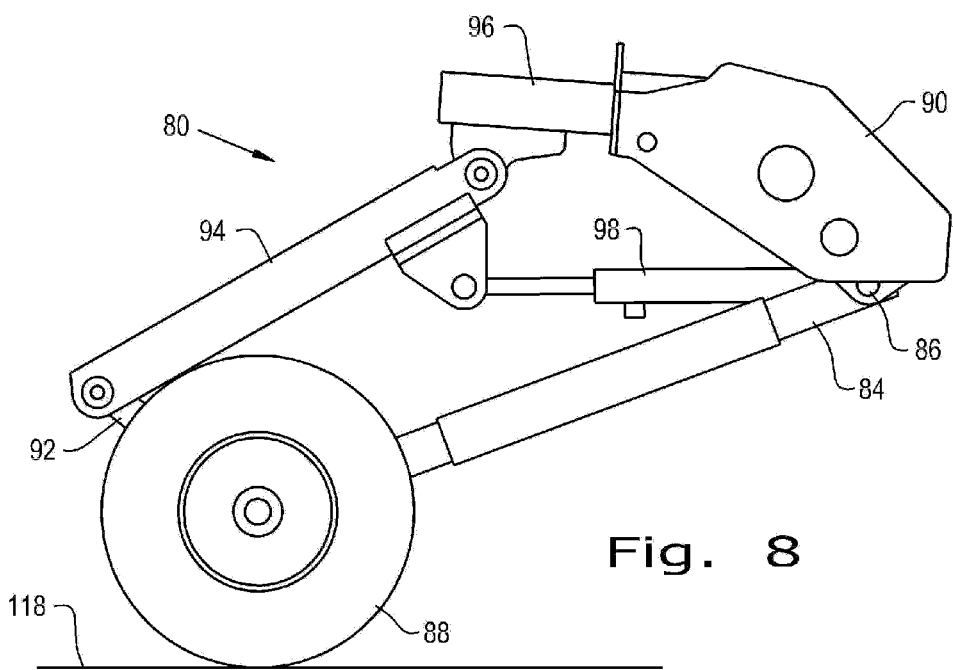
FIG. 8 is a side view of the axle assembly shown in a partially extended position contacting the road surface.
Figure 10:
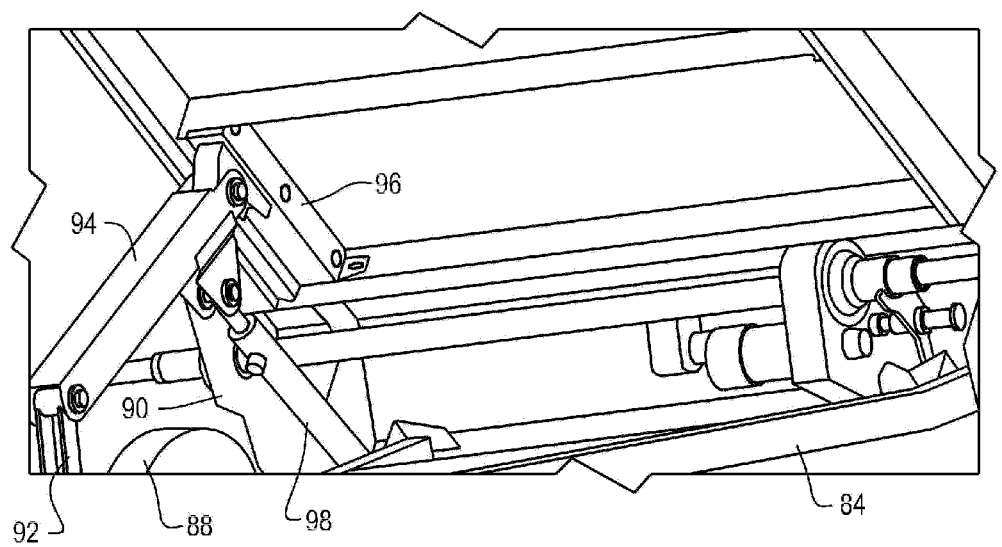
FIG. 10 is a fragmentary bottom perspective view of axle assembly attached to the bottom of the feeder housing.
Figure 9:
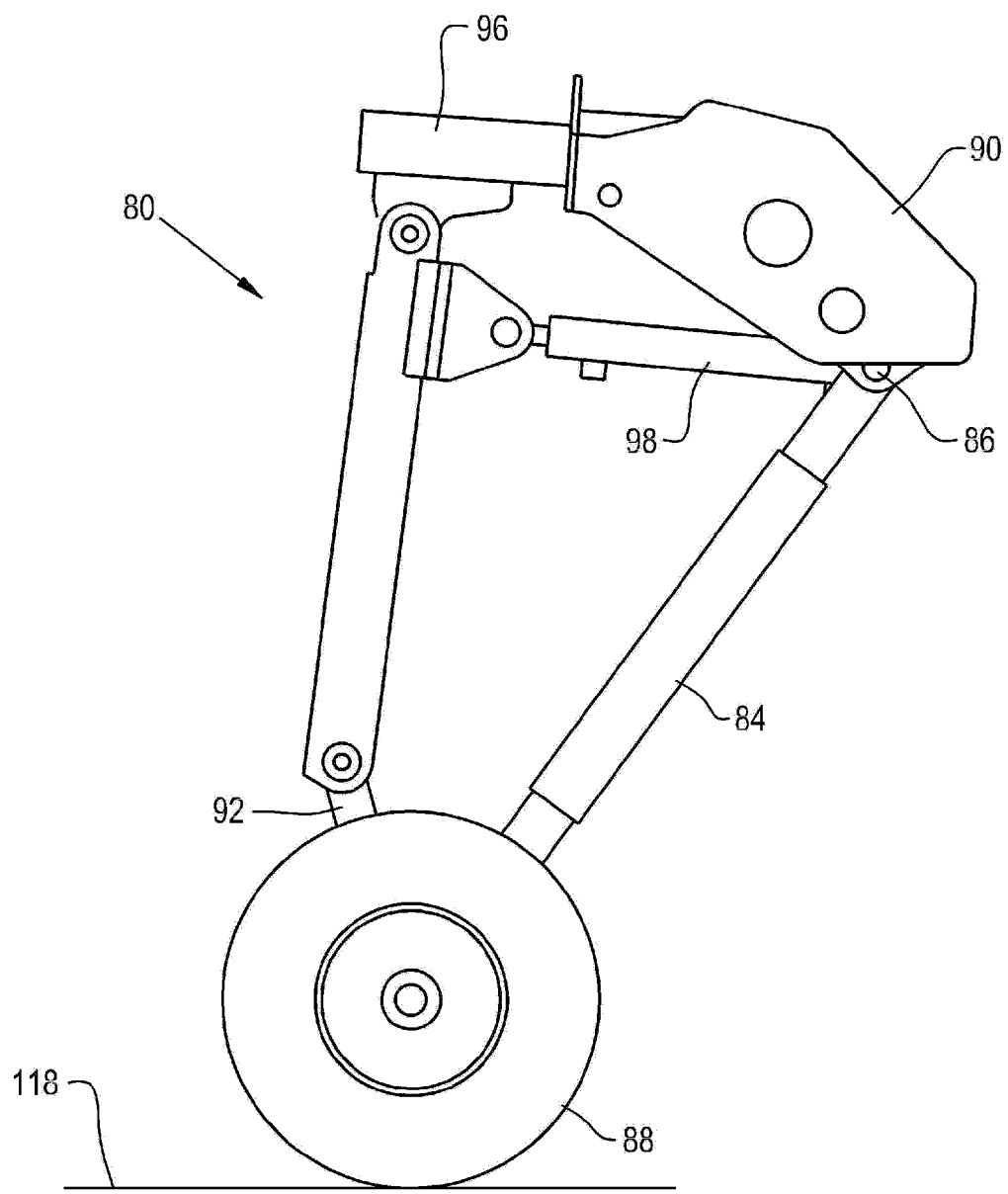
FIG. 9 is a side view of the axle assembly shown in a fully extended position contacting the road surface.

Referring now to FIGS. 1-3, conjunctively, combine 10 also includes a deployable auxiliary axle assembly 80 which is selectively deployable between an upward or field position (FIG. 2) and a downward or road position (FIG. 3). Auxiliary axle assembly 80 is pivotally coupled to a bottom of feeder housing 20 and generally functions to add an axle assembly and thereby distribute the weight load of combine 10 when in a transport or road mode. A pair of lift cylinders 82 interconnecting between either side of feeder housing 20 and the chassis 12 of combine 10 are used to raise the feeder housing 20 up and down, and an additional hydraulic cylinder (not specifically shown in FIGS. 2 and 3) is used to raise and lower the auxiliary axle assembly 80.

Referring now to FIGS. 4-10, axle assembly 80 includes a frame 84, a pair of pivot points 86 toward a forward end of frame 84, and a wheel 88 toward a rearward end of frame 84. Frame 84 has a generally triangular shape, with the pivot points 86 at the forward end being connected with mounting plates 90 which are attached to the feeder housing 20. Wheel 88 is mounted to the rearward apex of the frame 84 using a suitable wheel hub mounting arrangement. Although axle assembly 80 is shown with only a single wheel 88, it is also to be understood that it is possible to use more than one wheel on axle assembly 80 for some applications. An upstanding frame member 92 is pivotally mounted to the rearward apex of frame 84. A linkage 94 is connected to the top end of upstanding frame member 92, and also connected with a mounting bracket 96 which is attached to the bottom of feeder housing 20. A hydraulic actuator in the form of a hydraulic cylinder 98 I interconnects between frame 84 and linkage 94, and selectively moves the axle assembly 80 from the field position to the road position, or vice versa.

Figure 11:
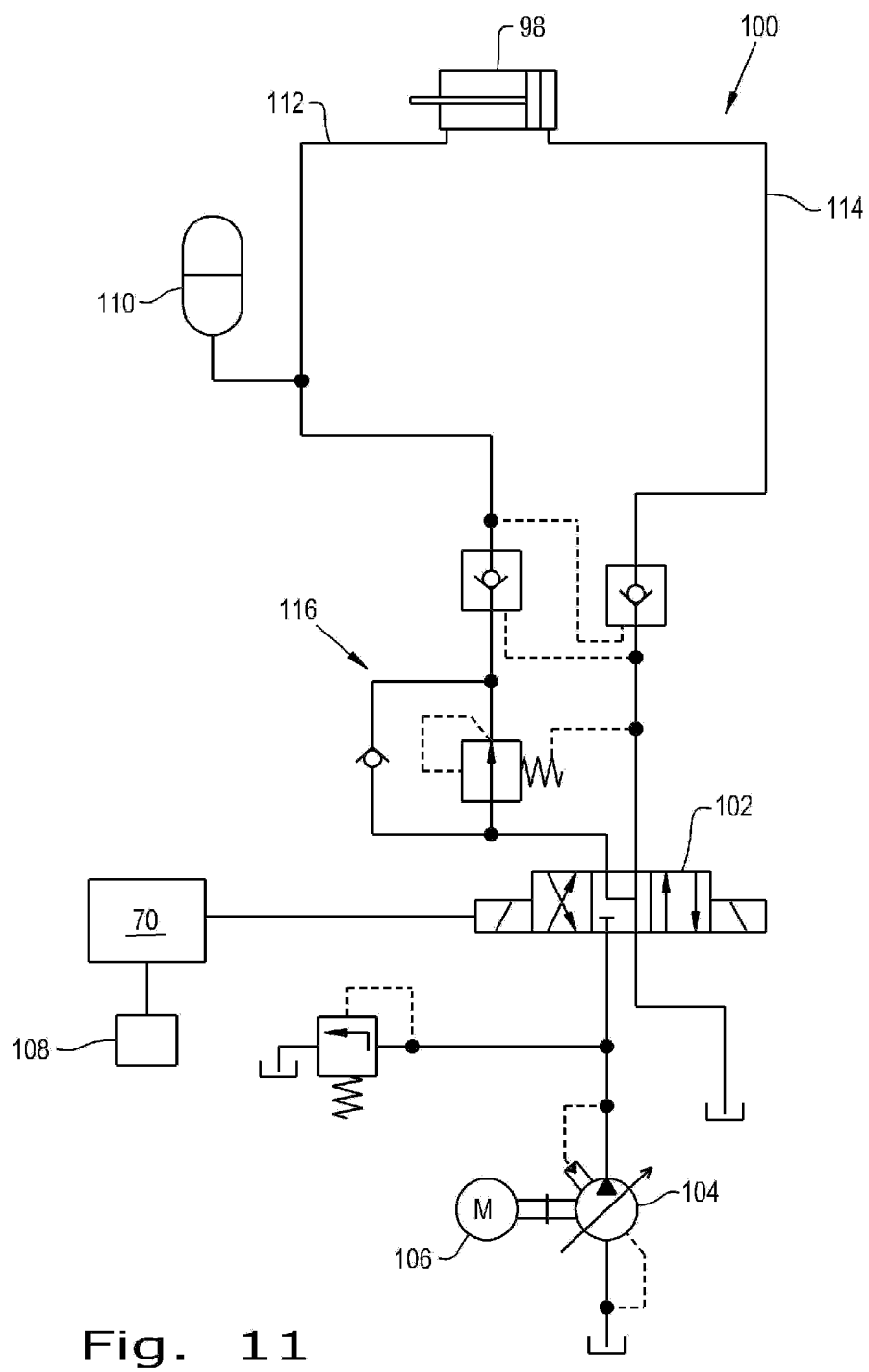
FIG. 11 is a schematic illustration of a hydraulic circuit which can be used with the axle assembly of the present invention.

FIG. 11 is a schematic illustration of a hydraulic circuit 100 used to control the deployable axle assembly 80 shown in FIGS. 4-10. A two-way valve 102 is fluidly connected between hydraulic cylinder 98 and a fluid pressure source in the form of a pump 104 driven by a motor 106. Valve 102 is coupled with and controlled by controller 70 to provide two-way operation of hydraulic cylinder 98. Controller 70 is also coupled with a road mode switch 108 which is preferably placed within operator cab 22 so as to be easily actuated by an operator. A hydraulic accumulator 110 is fluidly coupled between the valve 102 and hydraulic cylinder 98, preferably on the retract side of hydraulic cylinder 98, as shown. Accumulator 110 is directly connected with hydraulic cylinder 98 via fluid line 112, and thus the pressure is the same between accumulator 110 and hydraulic cylinder 98. The hydraulic pressure within accumulator 110 and hydraulic cylinder 98 can be measured at any convenient location, and is preferably measured in the fluid line 114 (on the extend side of hydraulic cylinder 98), opposite from fluid line 112, in order to detect fluid cavitation. A pressure relief valve 116 may also be provided between valve 102 and accumulator 110.

Figure 12:
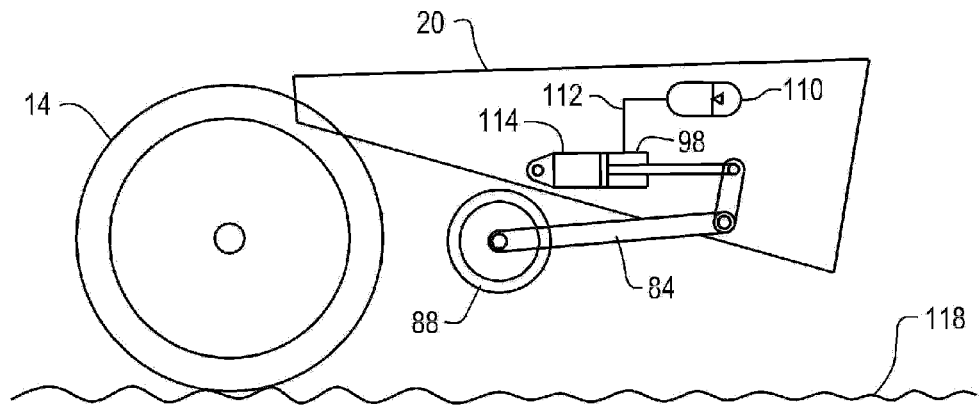
FIG. 12 is a schematic side view with the axle assembly shown in a deployed position and the feeder housing in a fully raised position, such that the axle assembly does not contact the road surface.
Figure 13:
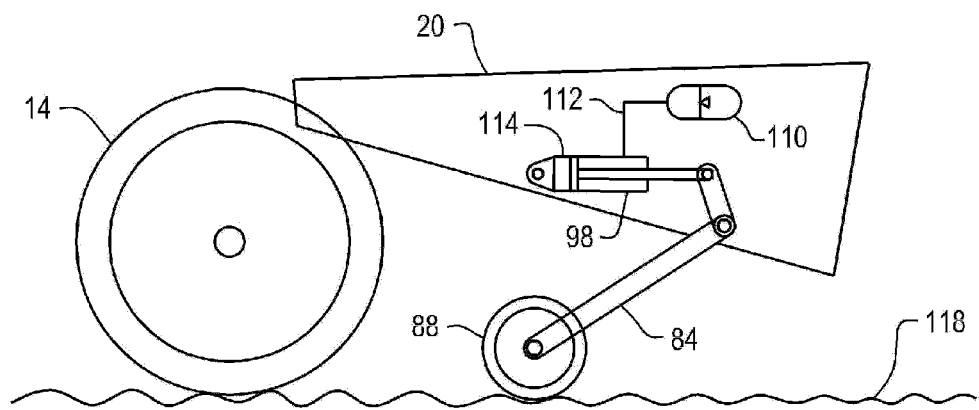
FIG. 13 is a schematic side view with the axle assembly shown in a deployed position and the feeder housing in a lowered position, such that the axle assembly contacts the road surface.

FIGS. 12 and 13 schematically illustrate the deployment sequence for one embodiment of auxiliary axle assembly 80. When an operator depresses the road mode switch 108 (FIG. 11), the controller 70 determines whether an auxiliary axle assembly 80 is present onboard the combine 10, and if so, deploys the axle assembly 80. First, the feeder housing 20 is raised to a predetermined position, which in the embodiment shown in FIG. 12 is a fully raised position. Then the axle assembly 80 is fully deployed by fully extending the hydraulic cylinder 98. With the wheel 88 positioned above the ground surface 118, valve 102 (FIG. 11) is operated under control of controller 70 to pressurize both the accumulator 110 and hydraulic cylinder 98 to a predetermined fluid pressure. Then the valve 102 is closed, and the feeder housing 20 is lowered using lift cylinders 82 until the wheel 88 contacts the ground, and continued to lower so as to retract the piston within hydraulic cylinder 98 and thereby increase the fluid pressure within accumulator 110 and hydraulic cylinder 98. When the fluid pressure within accumulator 110 and hydraulic cylinder 98 reaches a higher predetermined level, then the feeder housing 20 is stopped at that position, which in turns results in a substantially constant down pressure being exerted between the wheel 88 and ground surface 118 during road transport. This substantially constant down pressure occurs even with the occurrence of bumps, potholes or the like, as the combine 10 traverses over the ground surface. Alternatively, feeder housing 20 can be lowered to a predetermined position (corresponding to a predetermined pressure) and stopped at the predetermined position for the road mode.

Figure 14A:
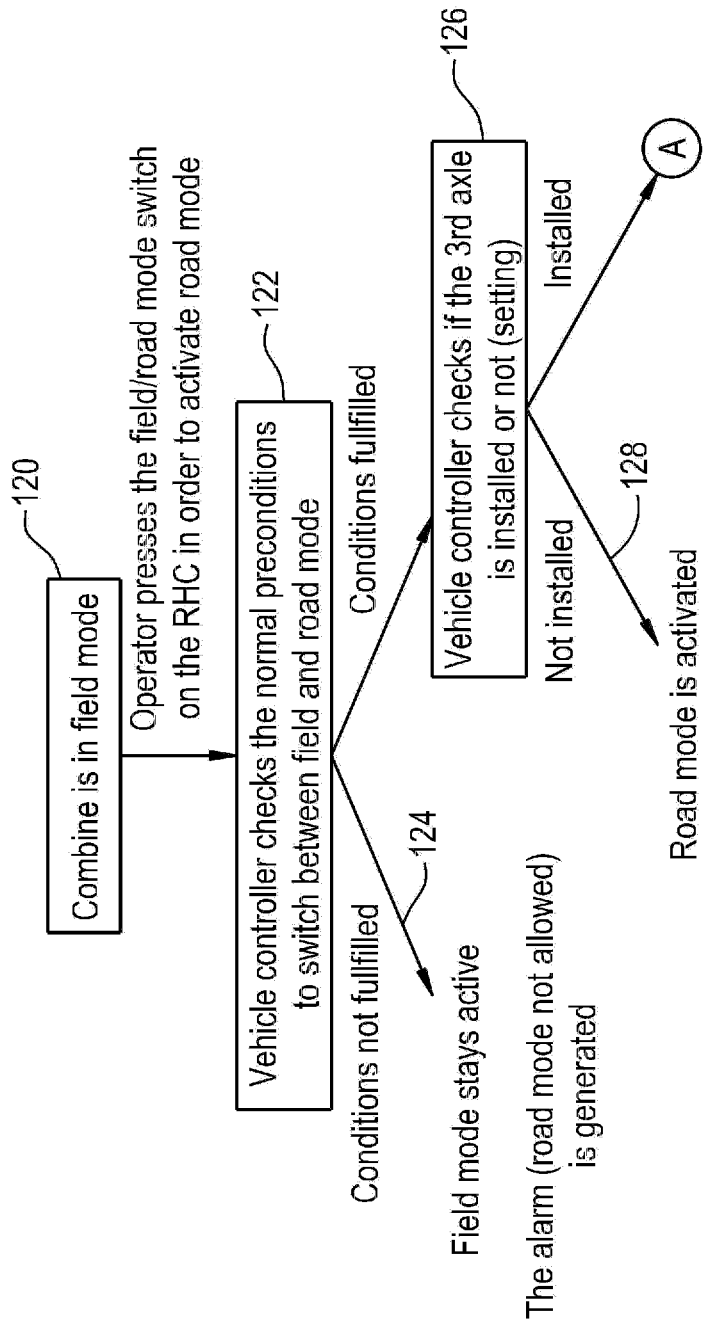
FIGS. 14A and 14B are a flow chart illustrating the control logic for deploying the axle assembly and placing the harvester in a road mode.
Figure 14B:
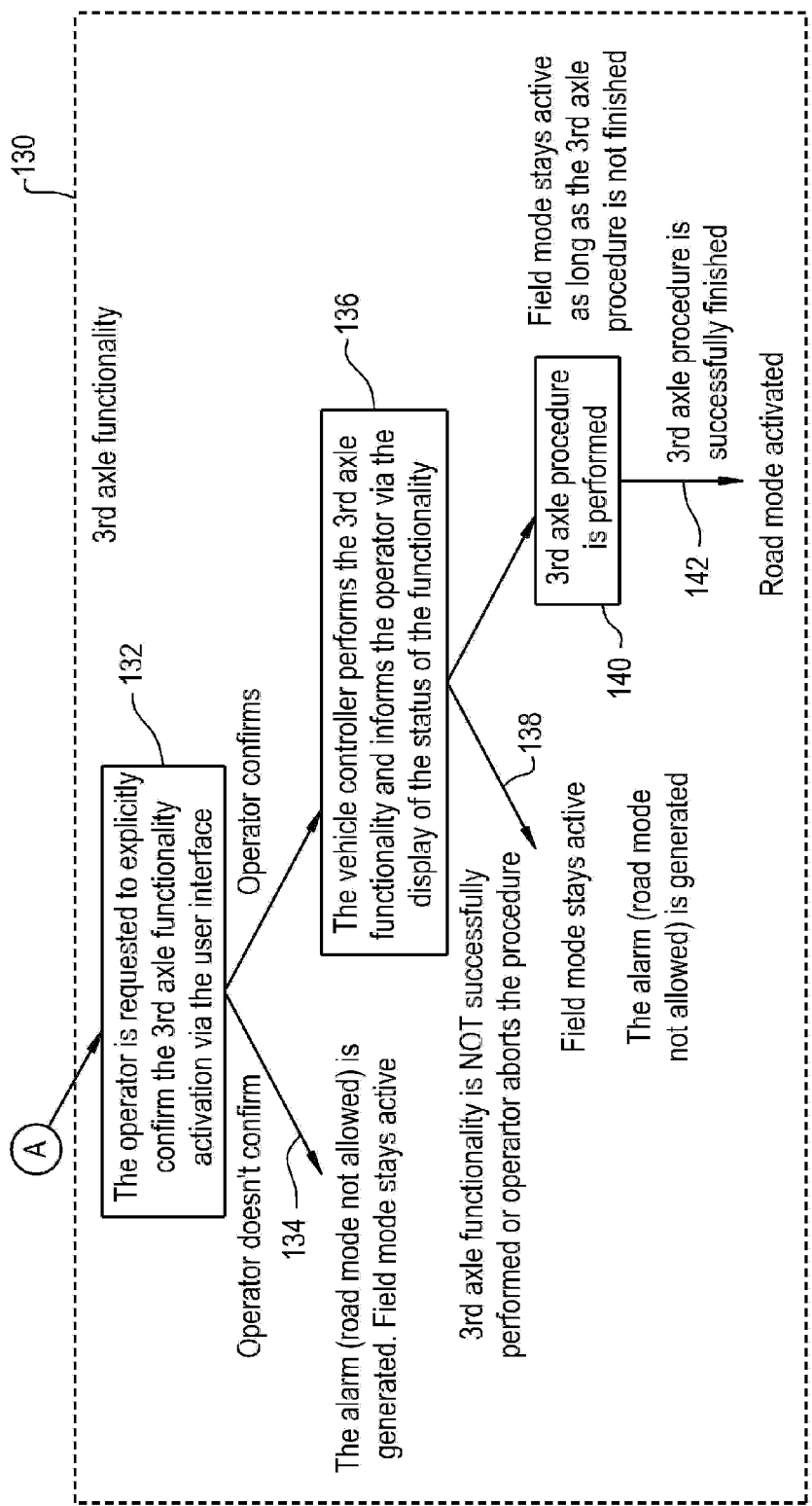

FIGS. 14A and 14B are a flowchart illustrating the deployment sequence of auxiliary axle assembly 80 in more detail. Prior to depressing the road mode switch 108, the combine 10 is in a field mode for field operation of combine 10 (step 120). When an operator depresses the road mode switch 108, an output signal is sent to controller 70 which effects an interlock for a number of mechanical functions on combine 10. For example, the header 18 and threshing and separating system 24 can be interlocked to prevent operation thereof during the road mode. Moreover, it is possible to prevent unloading auger 30 from swinging laterally outward to the unloading position during the road mode. The controller 70 checks the normal preconditions to switch between the field mode and the road mode when the road mode switch 108 is depressed (step 122). If the normal preconditions are not met, then the field mode stays active (line 124). On the other hand, if the normal preconditions are met, then the controller 70 also determines if the auxiliary axle assembly 80 is present onboard combine 10 (step 126). If the normal preconditions are met and no auxiliary axle assembly 80 is present, then the road mode is activated for combine 10 (line 128).

If the normal preconditions are met and an auxiliary axle assembly 80 is present on board combine 10, then the auxiliary axle assembly 80 is deployed using the methodology set forth within the dashed box 130. First, the operator is requested to explicitly confirm that the auxiliary axle assembly 80 is to be deployed (step 132). If the operator does not confirm the axle deployment, either through an explicit denial of the deployment or failure to confirm the deployment, then the road mode is not allowed and an alarm is generated (line 134). On the other hand, if the operator confirms the deployment of the auxiliary axle assembly 80, then the controller 70 deploys the axle assembly 80 in a manner as described above with reference to FIGS. 12 and 13. During and/or after the deployment sequence, the operator is informed of the deployment status using any convenient display such as a video display, etc (step 136). If the auxiliary axle assembly 80 is not successfully deployed or the operator aborts the deployment sequence, then the combine 10 remains within the field mode and an alarm is generated (line 138). Alternatively, if the auxiliary axle assembly 80 is successfully deployed (step 140), then the road mode is activated for combine 10 (line 142).

Figure 15:
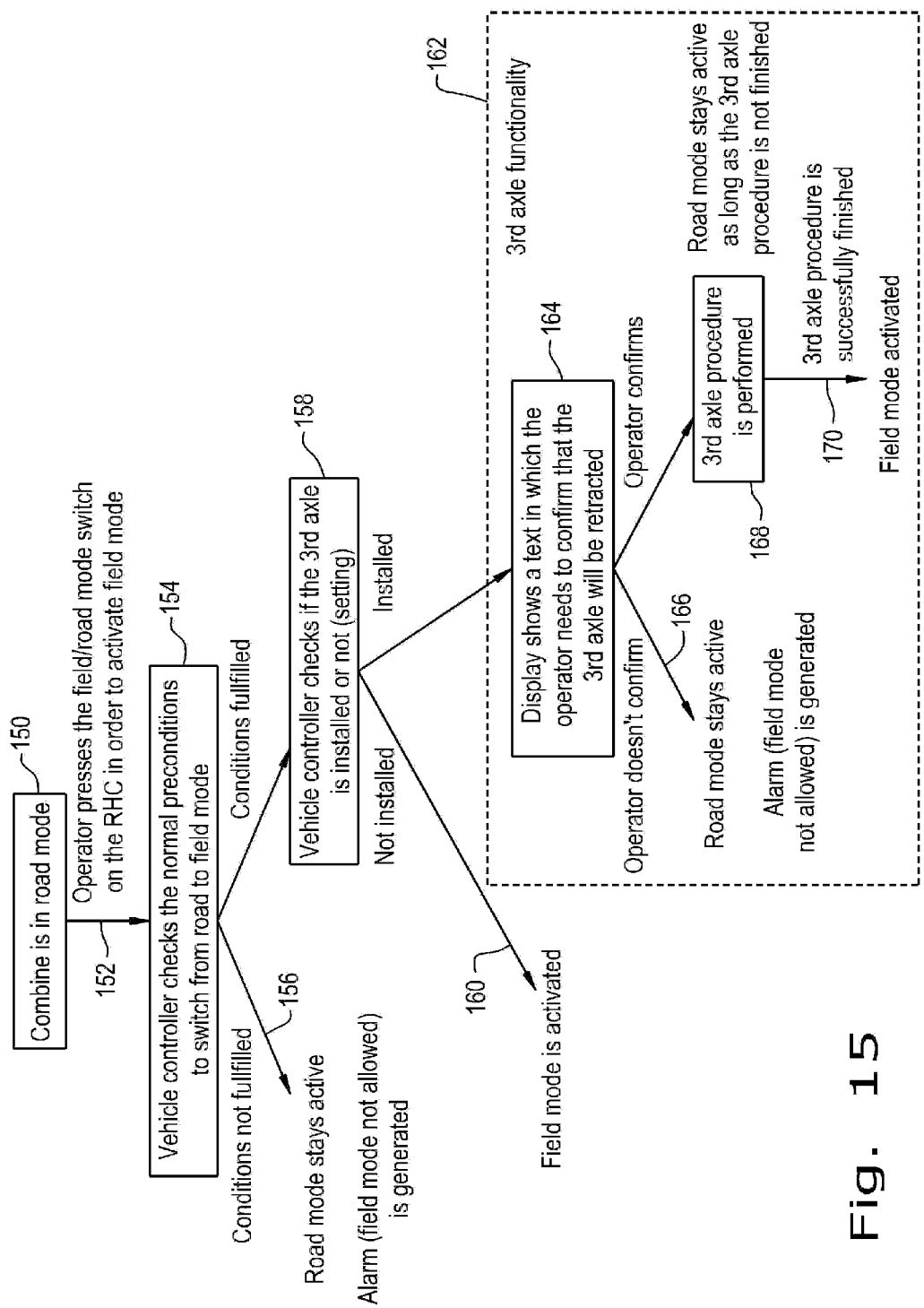
FIG. 15 is a flow chart illustrating the control logic for retracting the axle assembly and placing the harvester in a field mode.

FIG. 15 is a flowchart illustrating the controlled movement of the auxiliary axle assembly 80 from the road mode to the field mode. Prior to depressing the road mode switch 108, the combine 10 is in a road mode for transport of combine 10 over a ground surface (step 150). When an operator depresses the road mode switch 108, an output signal is sent to controller 70 which indicates that the operator desires to transform the combine 10 from a road mode to a field mode (line 152). Controller 70 then checks for the normal preconditions to switch combine 10 from the road mode to the field mode (step 154). If the normal preconditions are not met, then the combine 10 stays in the active road mode (line 156). On the other hand, if the normal preconditions are met, then the controller 70 determines whether an auxiliary axle assembly 80 is present onboard combine 10 (step 158). If an auxiliary axle assembly 80 is not determined to be present onboard combine 10, then the field mode is activated (line 160).

If the normal preconditions for changing to the field mode are met, and an auxiliary axle assembly 80 is determined to be present onboard combine 10, then the auxiliary axle assembly 80 is moved from the road (extended) position to the field (retracted) position using the methodology set forth within the dashed box 162. First, the operator is requested to explicitly confirm that the auxiliary axle assembly 80 is to be retracted to the field position (step 164). If the operator does not confirm the axle retraction to the field position, either through an explicit denial of the retraction or failure to confirm the retraction, then the road mode stays active and an alarm is generated (line 166). On the other hand, if the operator confirms the retraction of the auxiliary axle assembly 80, then the controller 70 retracts the axle assembly 80 to the field position (step 168) and the field mode is activated (line 170).

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural harvester, comprising:
a chassis;
a feeder housing pivotally mounted to said chassis;
an axle assembly pivotally mounted to said feeder housing, said axle assembly including at least one wheel;
a hydraulic actuator coupled with said axle assembly for pivotally moving said at least one wheel in upward and downward directions from said feeder housing;
a road mode switch providing a first output signal indicative of a field mode and a second output signal indicative of a road mode; and
a controller coupled with each of said road mode switch and said hydraulic actuator, said controller receiving said second output signal from said road mode switch and controlling said hydraulic actuator, whereby said hydraulic actuator provides a substantially constant down force between said at least one wheel and a ground surface.

2. The agricultural harvester of claim 1, further including a hydraulic accumulator fluidly coupled with said hydraulic actuator.

3. The agricultural harvester of claim 2, wherein said controller is operative to effect said substantially constant down force utilizing a deployment sequence for the axle assembly including:
raising said feeder housing to a predetermined position;
controlling said hydraulic actuator to pivot said axle assembly downward toward the ground surface;
fluidly closing said actuator and said accumulator at a substantially same pressure therebetween; and
lowering said feeder housing until a predetermined fluid pressure is obtained within said accumulator.

4. The agricultural harvester of claim 3, wherein said axle assembly does not contact the ground surface when pivoted downward by the hydraulic actuator during the deployment sequence.

5. The agricultural harvester of claim 4, wherein said axle assembly contacts the ground surface when the feeder housing is lowered.

6. The agricultural harvester of claim 3, wherein said predetermined position of the feeder housing is a fully raised position.

7. The agricultural harvester of claim 3, wherein said controller is operative to determine if said axle assembly is present on board said harvester, and to only allow the road mode to occur if the deployment sequence is properly carried out.

8. The agricultural harvester of claim 3, wherein the controller is operative to fluidly close said actuator and said accumulator by closing a valve between said accumulator and a fluid pressure source.

9. The agricultural harvester of claim 1, wherein said axle assembly includes a frame and at least one pivot point at a forward end of said frame, and said at least one wheel is positioned at a rearward end of said frame, said at least one pivot point pivotally coupling said frame with said feeder housing.

10. The agricultural harvester of claim 9, wherein said at least one pivot point pivotally couples said frame with a bottom of said feeder housing.

11. The agricultural harvester of claim 10, further including at least one mounting bracket, each said mounting bracket interconnecting said frame with said bottom of said feeder housing at a corresponding said pivot point.

12. The agricultural harvester of claim 1, wherein said road mode switch functions as an interlock for a number of mechanical functions on the agricultural harvester when actuated.

13. The agricultural harvester of claim 1, wherein said agricultural harvester is a combine harvester.

14. A method of operating an agricultural harvester, the harvester having a chassis, a feeder housing pivotally mounted to the chassis, and an axle assembly mounted to the feeder housing and including a wheel, said method comprising the steps of:
selectively actuating a road mode switch corresponding to a field mode or a road mode, said road mode switch providing a first output signal indicative of a field mode and a second output signal indicative of a road mode; and
controlling a deployment of the axle assembly by pivoting the axle assembly from a field position to a transport position using a hydraulic actuator, when the road mode switch is actuated for the road mode, whereby said hydraulic actuator provides a substantially constant down force between the wheel and a ground surface.

15. The method of claim 14, wherein said hydraulic actuator is fluidly coupled to a hydraulic accumulator, and wherein said controlled deployment of the axle assembly includes a deployment sequence of:
raising said feeder housing to a predetermined position;
controlling said hydraulic actuator to pivot said axle assembly downward toward the ground surface;
fluidly closing said hydraulic actuator and said hydraulic accumulator at a substantially same pressure therebetween; and
lowering said feeder housing until a predetermined fluid pressure is obtained within said hydraulic accumulator.

16. The method of claim 15, wherein said axle assembly does not contact the ground surface when pivoted downward by the hydraulic actuator during the deployment sequence.

17. The method of claim 16, wherein said axle assembly contacts the ground surface when the feeder housing is lowered.

18. The method of claim 15, wherein said predetermined position of the feeder housing is a fully raised position.

19. The method of claim 15, including the step of only allowing the road mode to occur if the deployment sequence is properly carried out.

20. The method of claim 15, wherein the step of fluidly closing said actuator and said accumulator is carried out by closing a valve between said accumulator and a fluid pressure source.

21. The method of claim 14, wherein said road mode switch functions as an interlock for a number of mechanical functions on the agricultural harvester when actuated.

* * * * *